Patented Jan. 23, 1940

2,187,812

UNITED STATES PATENT OFFICE 2,187,812

VAT DYESTUFF OF THE QUINAZOLINE SERIES

Fritz Baumann and Heinz Werner Schwechten, Leverkusen-I. G. Werk, Germany, assignors to General Aniline Works, Inc., New York, N. Y., a corporation of Delaware No Drawing. Application May 12, 1937, Serial No. 142,196. In Germany May 26, 1936

4 Claims. (Cl. 260—261)

The present invention relates to new vat dyestuffs.

Our new products may be defined as 4-aminoquinazolines wherein at least one of the hydrogen atoms attached to the 2-carbon-atom and to the 4-amino-group is replaced by a radical of a compound which is capable of being vatted. For clarity's sake we are giving in the following a formula which is illustrative of our new products

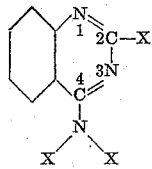

it being to be understood that at least one of the X's stands for a radical of a compound which is capable of being vatted, whereas the other X may stand for hydrogen or an alkyl or aryl radical. Examples of suitable compounds which are capable of being vatted are anthraquinones, anthraquinone-benzene- or naphthalene-acridones, pyrazol-anthrones and thiazol-anthrones, it being to be understood that these compounds may contain further substituents such as nitro groups, halogen atoms, amino groups or aroylamino-groups. Preferred compounds are those of the following type

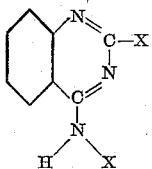

wherein both X's stand for a radical of a compound which is capable of being vatted. Obviously, the presence of other substituents in the nuclei is not precluded. Suitable substituents are nitro groups, amino groups, carboxylic acid groups or halogen atoms which all permit one to employ such products as starting materials for other dyestuffs. The products which are obtainable in accordance with the present invention represent valuable vat dyestuffs of excellent fastness properties.

The method of manufacture of our new products is illustrated by the following equation:

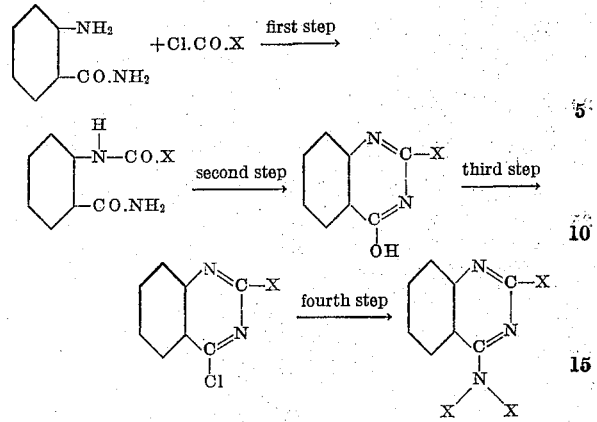

It is evident therefrom that the desired substituents can be introduced into the 2-position of the quinazoline by a suitable choice of the carboxylic acid chlorides. We wish to point out that the second step of the reaction, viz. the ring closure to the quinazoline nucleus is effected by an alkaline treatment whereas the 4-hydroxyl group is converted into a halogen atom by a treatment with for instance phosphorus pentachloride; the reaction of the 4-chloro-quinazoline thus obtained with the amine (fourth step) is performed by simply heating the products in the presence of a suitable solvent such as dichlorobenzene, nitrobenzene or phenol, preferably at a temperature between about 100° C. and about 210° C. In most cases the final products separate out during the reaction or upon cooling.

The following examples illustrate the invention, without however restricting it thereto, the parts being by weight.

Example 1

42 parts of 2-(1'-nitro-2'-anthraquinonyl)-4-chloroquinazoline (prepared from 1-nitro-anthraquinone-2-carboxylic acid chloride + anthranilic acid amide) and 30 parts of 4-amino-5'-chloro-anthraquinone-2.1(N)-1'2'(N)-benz-acridone are heated to boiling in 750 parts of phenol until the evolution of hydrochloric acid is finished. After diluting with 200 parts of nitrobenzene the well crystallized reaction product is filtered with suction at 90° C., washed with warm nitrobenzene and dried. The dyestuff dyes cotton from a dark red vat dark blue shades the nitro group being reduced into the amino group at the same time.

By benzoylating this dyestuff in which the nitro group is reduced into the amino group a product is obtained which dyes cotton from a redbrown vat green shades·

When starting for the preparation of chloroquinazoline from 1-nitro-anthraquinone-6-carboxylic acid chloride instead of from 1-nitro-anthraquinone-2-carboxylic acid chloride reducing the nitro group of the quinazoline and benzoylating the amino group as described above a product is obtained which dyes cotton similar green shades. Further dyestuffs of similar properties can be obtained by starting for the preparation of the chloroquinazoline from α-chloro-anthraquinone-carboxylic acid chloride; the chlorine group in the products thus obtained can be substituted by the amino group and the latter can be benzoylated as described above.

*Example 2*

30 parts of 2-(2'-thiazolanthronyl)-4-chloro-quinazoline (prepared from thiazolanthrone-2-carboxylic acid chloride + anthranilic acid amide), 22 parts of 4-amino-5'-chloroanthraquinone-2.1(N)-1'2'(N)-benzacridone and 500 parts of phenol are heated to boiling until no more hydrochloric acid is present. After diluting with 150 parts of nitrobenzene the well crystallized dyestuff is sucked off at 90° C., washed with nitrobenzene and dried. It dyes cotton from a dull dark red vat strong green shades of excellent fastness properties.

We claim:

1. The product of the formula

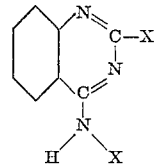

wherein the X attached to the carbon stands for an anthraquinone radical and the X attached to the nitrogen stands for a benzacridone-anthraquinonyl radical.

2. The product of the formula

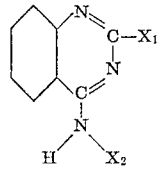

wherein the X attached to the carbon stands for a 1.9-isothiazolanthronyl radical and the X attached to the nitrogen stands for a benzacridone-anthraquinonyl radical.

3. The product of the formula

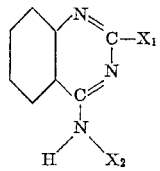

wherein $X_1$ stands for a vattable para-quinoidic radical containing at least 3 condensed rings, a nuclear carbon atom of said radical being directly attached to the quinazoline radical in the position indicated and $X_2$ stands for a vattable para-quinoidic radical containing at least 3 condensed rings.

4. The product of the formula wherein $X_1$ stands for a vattable para-quinoidic radical containing at least 3 condensed rings, a nuclear carbon atom of said radical being directly attached to the quinazoline radical in the position indicated and $X_2$ stands for a benzacridone-anthraquinonyl radical.

FRITZ BAUMANN.
HEINZ WERNER SCHWECHTEN.